March 3, 1970

A. E. SHECKELLS 3,497,997

QUARTERLINE STOP CONTROL SYSTEM FOR POWER DRIVEN REVOLVING DOORS

Filed June 14, 1968

INVENTOR
AMUEL E. SHECKELLS

BY Brady, O'Boyle & Gates

ATTORNEYS

United States Patent Office 3,497,997
Patented Mar. 3, 1970

3,497,997
QUARTERLINE STOP CONTROL SYSTEM FOR POWER DRIVEN REVOLVING DOORS
Amuel E. Sheckells, Evansville, Ind., assignor to International Steel Company, Evansville, Ind., a corporation of Indiana
Filed June 14, 1968, Ser. No. 737,207
Int. Cl. E05d *15/02;* E05f *15/12*
U.S. Cl. 49—43                                16 Claims

ABSTRACT OF THE DISCLOSURE

Control apparatus for electrically driven revolving doors wherein a plurality of magnetically actuated reed switches are selectively actuated as the revolving door turns upon initiation of movement from a stop position to effect preselected speeds of rotation during various portions of a revolution of the door and coming to a controlled stop at the quarterline position after a complete revolution. For example, when activated by power-assisted fingertip pressure or other means from the quarterline position, the door wings commence a revolving cycle, turning approximately five-eights of a revolution at walking speed, slowing for the balance of one revolution at a relatively slower speed and finally stopping at the quarterline position.

CROSS REFERENCE TO RELATED APPLICATION

The subject invention is an improvement of the invention disclosed in United States patent application Ser. No. 737,190 entitled "Quarterline Stop Position Control Circuit for Power Driven Revolving Doors," filed on June 14, 1968, in the name of Amuel E. Sheckells, and which is assigned to the assignee of the present invention.

BACKGROUND OF INVENTION

The present invention relates to revolving door apparatus and more particularly to control apparatus for power assisted revolving doors wherein a user enters the enclosure and by either a gentle nudge on the wings or touching a pushbar or the like, rotation of the door commences, being electrically driven at a predetermined safe walking speed.

Control circuits for electrically driven revolving doors are known to those skilled in the art of which United States Patents 2,954,971 and 3,020,038 issued to A. M. Simpson are illustrative examples; furthermore, speed control mechanisms for such apparatus are illustrated by United States Patents 3,349,876; 3,308,912 and 3,307,660; issued to Amuel E. Sheckells. These patents are assigned, moreover, to the assignee of the present invention. The aforementioned speed control mechanisms disclose a relatively thin, low-profile device which couple the revolving door shaft to a small electrically driven motor and limit the speed of the revolving doors to a safe walking speed. Such an assembly renders the apparatus readily adaptable for selective mounting either over-head or floor-type installations.

SUMMARY OF INVENTION

The present invention is directed to means for stopping the wings of an electrically driven revolving door at the quarterline position with respect to the enclosure wherein a speed controller couples power from an electrical drive motor to the door shaft to which the doorwings are attached in mutually perpendicular relationship, and comprises in combination, magnetic switch actuator means in the form of a predetermined strip length of magnetic material circularly disposed in circular holder means located in the speed controller and coupled to the door shaft so that it revolves in accordance therewith; a plurality of magnetically actuated reed switches located adjacent said magnetic strip in the speed controller, being consecutively energized by means of the magnetic strip as the revolving door rotates; and motor control circuit means coupled to said reed switches for generating the necessary electrical power signals for driving the electrical motor at selected speeds as well as stopping it at the quarterline position. The relative location of the reed switches with respect to the instantaneous position of the magnetic strip once the revolving door is started defines a high-speed, low-speed and quarterline stop position so that upon actuation the revolving door revolves at a safe walking speed over a first selected portion of a revolution (⅝ rev.), at a relatively lower speed for substantially the remainder of the door revolution (⅜ rev.), and coming to a stop at the quarterline position.

DESCRIPTION OF PREFERRED EMBODIMENTS

Figure 1:
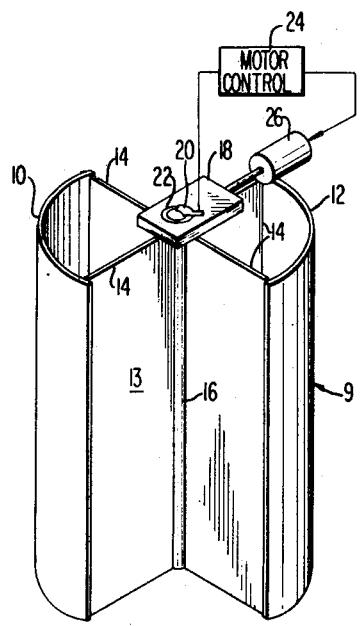
FIGURE 1 is a perspective view of an electrically driven revolving door in an enclosure and having a speed controller and a motor control circuit embodying the subject invention coupled thereto.

Referring now to the drawings, and more particularly to FIGURE 1, a revolving door enclosure 9 comprising circular sidewalls 10 and 12 encloses an electrically driven revolving door 13 comprised of four door wings 14 secured to a revolving door shaft 16 in mutually perpendicular alignment. The wings 14 are shown in the quarterline stop position whichv is defined as that position where mutually opposite wings are at substantially the same location on the respective circular sidewalls 10 and 12 with all four door wing airlock strips, not shown, touching the enclosure walls 10 and 12.

A speed controller mechanism 18 of the type disclosed with reference to the referenced Sheckells patents, for example, U.S. Patent No. 3,308,912 as well as the above noted related application Ser. No. 737,190, is located on the door shaft 16. The motor controller 18 exhibits a relatively thin profile and is adapted to additionally include a magnetic reed switch assembly 20 and circular reed switch actuator assembly 22 located therein for controlling the door operation. The reed switch assembly 20 is electrically coupled to a motor control circuit 24 which generates electrical signals in response to magnetic reed switch actuation for driving the electric motor 26 coupled to the speed controller 18 and thereby turning the revolving door 13 at selected speeds during predetermined portions of a complete revolution and finally stopping the revolving door after a substantially complete revolution at the quarterline position as shown.

Figure 2:
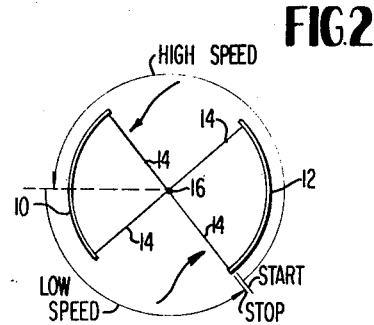
FIGURE 2 is a diagram illustrative of the quarterline stop position of the revolving door wings with respect to the enclosure.

FIGURE 2 is further illustrative of the door wings 14 being stopped at the quarterline position within the enclosure walls 10 and 12. Additionally, FIGURE 2 illustrates that when a user enters the enclosure and moves to the right, the revolving door wings 14 are energized away from the quarterline stop position. The shaft 16 and wings 14 will turn counter-clockwise for substantially five-eighths of a revolution at a relatively high speed while maintaining safe walking speed. For the remainder or approximately three-eighths of a revolution the wings 14 will rotate at a relatively lower speed until the quarterline stop position is reached at which time the wings 14 stop turning.

Figure 3:
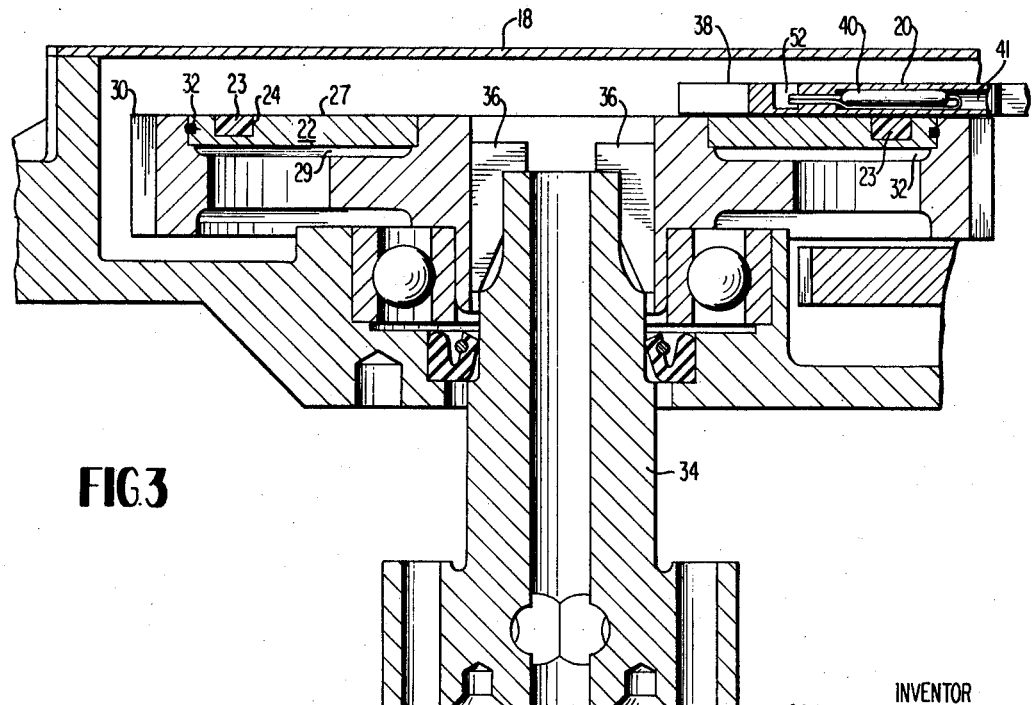
FIGURE 3 is a fragmentary cross-sectional view of a stub shaft and spur gear secured thereto included in the speed controller illustrating the magnetic strip holder mounted in the upper recess of the spur gear with a reed switch holder including a plurality of reed switches located directly above the spur gear.

Considering now the invention in greater detail, attention is directed to FIGURE 3 which discloses a fragmentary cross-sectional view of a portion of a low profile speed controller assembly 18 wherein the magnetic reed switch assembly 20 and the circular magnetic actuator assembly 22 are located. A length of magnetic strip 23 is inserted and held in a circular slot 24 provided in a magnet holder 27 which is circular in configuration and is mounted inside of a recess 29 provided in the upper portion of a spur gear 30 which is adapted to be turned by means of a gear and clutch assembly, not shown, located within the speed controller 18. The magnet holder 27 is fitted into the recess 29 and held by means of a resilient O-ring 32 so that the upper surfaces are substantially coplanar. Additionally, the frictional force provided by the O-ring 32 allows the magnet holder 27 to be manually revolved independently of the spur gear 30 to any selected position and then retained at that position. The spur gear 30 is secured to a stub shaft 34 by means of two keys 36 so that the stub shaft 34 is adapted to rotate in accordance with the rotation of the spur gear 30. The stub shaft is adapted to be coupled to the revolving door shaft 16 shown in FIGURE 1.

The spur gear 30 is thus driven by the electrical drive motor 26 while the door shaft 16 and the wings 14 are rotated by means of the stub shaft 34 coupled to the spur gear 30. Additionally the magnet holder 27 and consequently the magnetic strip 23 rotate in combination therewith due to its location on the spur gear 30.

The magnetic reed switch assembly 20 is located directly above the spur gear 30 and the magnet holder 27. The magnetic reed switch assembly 20 comprises a reed switch mount 38 which is secured to the housing of the speed controller 18 and is adapted to extend over a portion of the perimeter of the combination of the spur gear 30 and the magnet holder 27. A plurality of reed switches of which one reed switch 40 is an illustrative example is mounted in respective recesses or slots 41 with the electrical leads adapted to be fed out into a channel 52. The reed switch 40 and the other reed switches, not shown, are centrally located over the magnetic strip 23 and are responsive to the presence of the magnetic strip 23 therebeneath during each revolution of the spur gear 30 to be actuated or closed thereby. The magnetic strip 23 is not continuous for a complete circle but is only continuous for a little more than three-quarters of a complete revolution. For example, refer to FIGURE 5. When there is an absence of the magnetic strip 23 beneath the reed switch 40 and the others, not shown, it will be open or unenergized.

Figure 4:
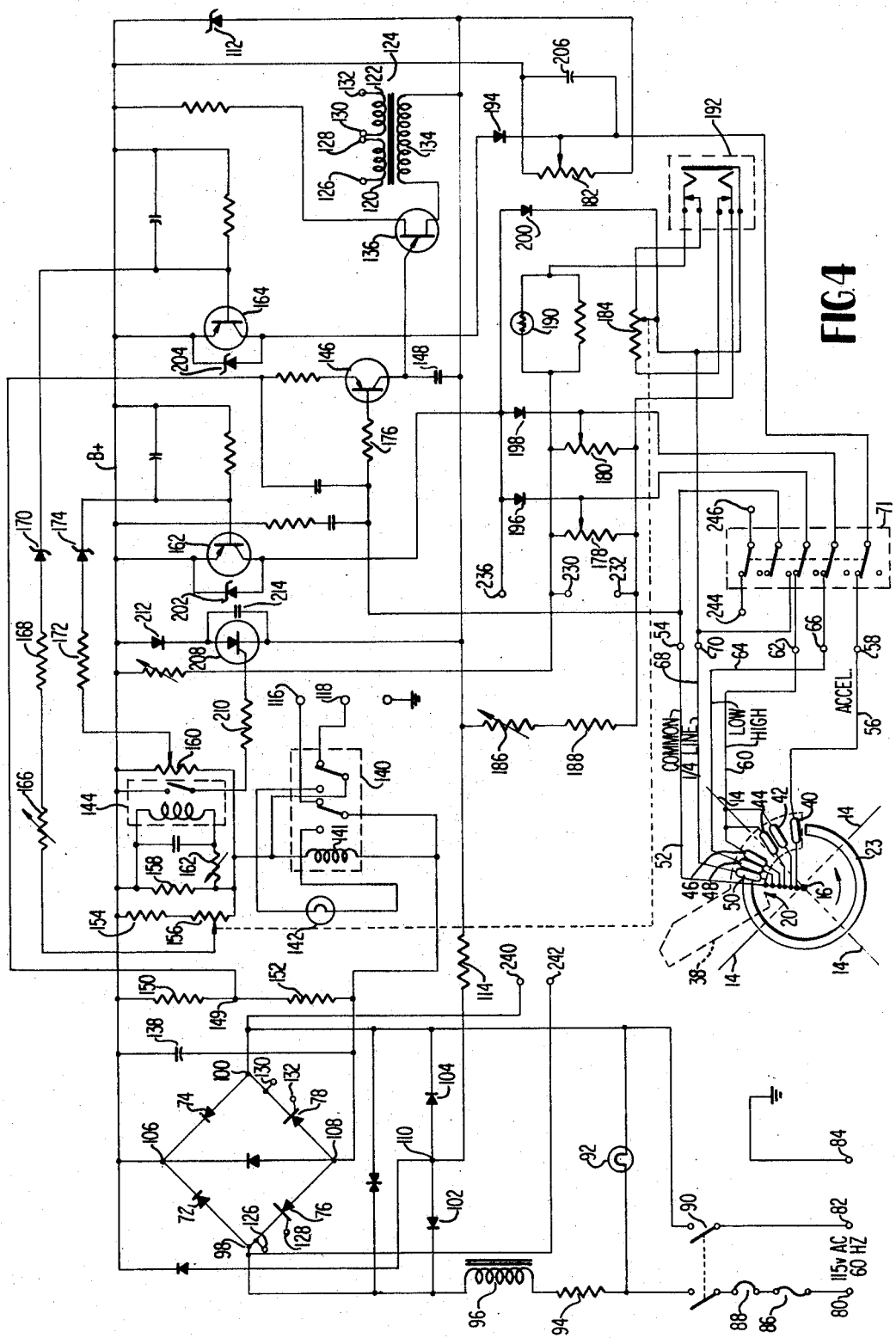
FIGURE 4 is an electrical schematic diagram of the motor control circuit utilized in combination with the magnetic reed switches which are actuated by the circular magnetic strip shown in FIGURE 3.

Referring now to the schematic diagram illustrated in FIGURE 4, six magnetic reed switches 40, 42, 44, 46, 48, and 50 are selectively positioned in the circular end portion of the switch mount 38. The magnetic strip 23 is adapted to travel beneath and consecutively actuate the switches 40 through 50 once every complete revolution of the revolving door wings 14. The magnetic reed switch 40 when energized is adapted to cause the circuitry schematically illustrated in FIGURE 4 to start the door into operation.

The magnetic strip 23 is shown in the quarterline position with respect to the reed switch assembly 20 such that the leading edge of the strip 23 is just out of range of the first reed switch 40 while the trailing edge is still actuating reed switch 50. A slight push on the revolving door wings 14 will cause the leading edge of the magnetic strip 23 to actuate the reed switch 40 at which time the electrical drive motor 26 shown in FIGURE 1 is started in accordance with the circuit operation which will be described subsequently.

The magnetic switch 40 has one of its leads connected to a "common" circuit lead 52 which is coupled to a reed switch assembly output terminal 54 while the opposite lead is connected to an "acceleration" lead 56 which is coupled to reed switch output terminal 58. Three reed switches 42, 44, and 46 are commonly coupled to a "high" speed lead 60 which is coupled to the output terminal 62. The next-to-last reed switch 48 is coupled to a "low" speed lead 64 which is connected to output terminal 66. And finally, the last reed switch 50 is connected to the "quarterline" stop lead 68 which is in turn coupled to output terminal 70. The reed switch assembly output terminals 54, 58, 62, 66, and 70 are coupled through a manually operated multi-pole, double-throw switch 71 to the motor control circuitry referred to in block diagrammatic form by reference numeral 24 in FIGURE 1 and comprises, inter alia, a bridge rectifier circuit containing two diodes 72 and 74 and two silicon controlled rectifiers 76 and 78 powered from a 115 v. AC, 60 Hz. line, not shown, applied across terminals 80 and 82. A neutral ground terminal 84 is also included. The line potential is applied through a fuse 86, circuit breaker 88, and an "on-off" switch 90. Additionally, following the on-off switch 90, a pilot light 92 is placed across the line potential while a surge resistor 94 and a choke 96 are placed in series in one side of the line for providing AC filtering. A second bridge circuit is included utilizing the already mentioned diodes 72 and 74 and two additional diodes 102 and 104.

The purpose of the first bridge circuit containing the silicon controlled rectifiers 76 and 78 is for providing a variable DC voltage across terminals 106 and 108 in response to the length of time the silicon controlled rectifiers (SCR) 76 and 78 are rendered conductive while the second bridge circuit provides a fixed DC potential across terminals 106 and 110. This fixed voltage is regulated by means of a Zenner diode 112 coupled across terminals 106 and 110 by means of resistor 114. This fixed DC potential provides a B+ supply potential for the remainder of the circuitry. The DC output voltage across terminals 106 and 108, however, provides a motor drive potential for the electrical motor 26 shown in FIGURE 1 coupled across terminals 116 and 118 and is dependent upon the potential appearing across bridge terminals 106 and 108.

It should be pointed out that a silicon controlled rectifier is nonconductive until a control voltage is applied to its gate electrode. Accordingly, it is the purpose of the circuitry disclosed in FIGURE 4 to control the conductivity of the silicon controlled rectifiers 76 and 78 to produce predetermined drive voltages at terminals 116 and 118. The required triggering of the silicon controlled rectifiers 76 and 78 is produced by the secondary windings 120 and 122, respectively, of transformer 124. More specifically, terminals 126 and 128 are coupled to the cathode and gate, respectively, of silicon controlled rectifier 76. In like manner, transformer terminals 130 and 132 are coupled to the cathode and gate, respectively, of silicon controlled rectifier 78. The primary winding 134 of transformer 124 is connected into the base circuit of a unijunction transistor oscillator comprising unijunction transistor 136. The unijunction transistor oscillator is selectively gated as will be described more fully subsequently, to provide triggering of the silicon controlled rectifiers 76 and 78 and thereby provide the required drive potential for the motor at terminals 116 and 118. Capacitor 138 is included to provide ripple filtering of the DC potential across terminals 106 and 108.

A relay 140 is coupled between the bridge rectifier including silicon controlled rectifiers 76 and 78 and the terminals 116 and 118 so that its relay coil 141 is coupled across the motor output terminals 116 and 118. The connection is made through its own relay contacts so that the potential applied to the motor is interrupted should the DC voltage appearing across terminals 108 and 106 exceed a predetermined value thus providing a protective feature for the drive motor as well as the individual going through the door. A pilot light 142 is coupled across one set of contacts in the relay 140 to provide an indication of motor turnoff due to excessive voltage. Additionally, another relay 144 is included in the circuitry for providing turnoff of the drive motor in the event that an excessive high current is present. Its operation will be discussed subsequently.

Returning to the unijunction transistor oscillator circuit including unijunction transistor 136, it also includes a transistor 146 and a capacitor 148 coupled to the emitter of transistor 136. In a conventional free-running unijunction oscillator, the transistor 146 would be replaced by a resistor; however, when transistor 146 is nonconductive, it acts as an open circuit and therefore the oscillator will be inoperative and the trigger potentials appearing across secondary windings 120 and 122 will be nonexistent. If, on the other hand, transistor 146 is conductive, the transistor will then act as an impedance and the unijunction oscillator will become operative. It should also be pointed out that the impedance of the transistor is variable depending upon the degree of conductivity. By controlling the conductivity of transistor 146 the frequency of the unijunction oscillator may be varied as well as turned on and off to produce the variable gating periods of the silicon controlled rectifiers 76 and 78. It should be noted that the emitter of transistor 146 is coupled to terminal 149 of a voltage divider comprising a pair of series connected resistors 150 and 152 directly connected across the terminals 106 and 108. Resistors 150 and 152 moreover are in parallel with the motor terminals 116 and 118 and provide an appropriate supply voltage for transistor 146. Additionally, a parallel circuit combination including series connected resistor 154 and potentiometer 156, resistor 158 and potentiometer 160 are placed in series with the motor drive terminals 116 and 118 through the relay 140. The fixed resistor 158 is of a comparably low value so that the majority of current travels through this path. Relay 144 is coupled across resistor 158 through the variable resistor 162 and effectively becomes a current controlled device.

Potentiometer 160 is of an appropriate value to actuate a motor torque control circuit partially including transistor 162. The potentiometer 156 and the fixed resistor 154 on the other hand control an acceleration torque control circuit partially including transistor 164. Potentiometer 156 is coupled to the base of transistor 164 by means of a series combination of variable resistor 166, the fixed resistor 168 and the Zener diode 170 while potentiometer 160 is coupled to the base of transistor 162 through the fixed resistor 172 and the Zener diode 174.

Considering now the operation of the motor control circuit without regard to the torque and acceleration torque control circuits including transistors 162 and 164, respectively, it has already been noted that transistor 146 controls the action of the unijunction transistor 136 for triggering the silicon control rectifiers 76 and 78. The amount of control is determined by the conductivity, as mentioned earlier, of transistor 146. This in turn is determined primarily by the amount of base current flowing in the base-emitter junction. This is accomplished by means of the circuit including the base resistor 176 and the combination of potentiometers 178, 180, 182, and 184, the reed switch configuration including reed switches 40 through 50, and the manually operated switch 71. The amount of conduction of transistor 146 is determined by the position of the tap of each of the potentiometers 178, 180, 182 and 184 and sequential connection thereof to the base resistor 176 by means of the consecutive actuation of the reed switches. For example, when the magnetic strip 23 activates reed switches 40, the tap of potentiometer 182 is coupled to the base resistor 176; however, when reed switches 42, 44, 46 and 48 are actuated, the tap of potentiometers 178 and 180 are also connected in parallel. And still further when reed switch 50 is actuated, the tap of potentiometer 184 is also connected in parallel to the base resistor 176. Such a sequence of connections of the taps provides a plurality of different unijunction oscillator frequencies which in turn provide as many as seven different motor drive potentials and therefore speeds for each cycle of door operation. Additional control is provided over the voltage appearing across potentiometers 178, 180, 182, and 184 by means of the variable resistor 186 and the fixed resistor 188. Moreover, potentiometer 184 is coupled to a thermistor 190 through a jack 192. The tap setting of resistor 184 is utilized for providing the quarterline stop control while the thermistor 190 automatically compensates for ambient temperature change. The jack 192 on the other hand is adapted to remove the potentiometer 184 from the circuit so that when desirable a comparable potentiometer, not shown, can be inserted in the circuit from a remote location.

Considering now the protective features of the circuit shown in FIGURE 4, first, as noted supra two torque control circuits are provided, one for giving protection when reed switch 40 only is closed (acceleration torque control) and the other when reed switches 42, 44, 46, 48 and 50 are actuated (running torque control). It should be noted than when all reed switches are closed, all of the taps of the potentiometers 178, 180, 182, and 184 are coupled to the base of the transistor 146; however, the current path of least resistance will be the controlling circuit. The reason for two circuits being required, one including transistor 162 and the other including transistor 164, is due to the fact that a higher torque is required for starting the electric motor coupled to terminals 116 and 118. It should be observed that when reed switch 40 is closed by means of the magnetic strip 23 the collector of transistor 164 is coupled to the tap of potentiometer 182 by means of the diode 194. The base of transistor 164, on the other hand, is coupled back to the tap of potentiometer 156. In the event that an excessive excitation current to the drive motor 26 occurs, it will be sensed across potentiometer 156 and transistor 164 will be rendered conductive. When transistor 164 becomes conductive, a second current path is open for current flow at the tap of potentiometer 182. If transistor 164 is sufficiently conductive, current flow will flow through transistor 164 instead of to the base of transistor 146, at which time transistor 146 will be rendered less conductive. This affects the oscillation of the unijunction transistor oscillator to cause the circuit silicon controlled rectifiers 76 and 78 to be triggered for a less time than previously and in the process reducing the voltage to the motor appearing across terminals 116 and 118. It should be noted that transistor 164 is operative only when current has increased at the motor to a predetermined point which is indicative of the motor being overloaded. Since potentiometer 156 is adjustable, it allows a variation in current path through transistor 164 thus providing a predetermined voltage setting at the potentiometer 156.

It should be pointed out that with respect to the torque control circuitry for the acceleration or starting circuit including reed switch 40 and potentiometer 182, a capacitor 206 is connected from the tap of poteniometer 182 to the B+ supply potential. Capacitor 206 is adapted to build up a charge which when reed switch 40 is actuated discharges giving a high pulse to the base of transistor 146 which in turn will render the transistor highly conductive momentarily. This will increase the frequency of the unijunction transistor oscillator and the silicon controlled rectifiers 76 and 78 will be triggered at a more rapid rate thus giving rise to a higher starting motor potential across terminal 116 and 118.

In a like manner, transistor 162 is connected by means of its collector electrode to the taps of potentiometers 178, 180 and 184 through the diodes 196, 198, and 200, respectively. The operation is the same as that described with respect to the other torque control circuit including transistor 164. Zener diodes 202 and 204 are respectively coupled across transistors 162 and 164 to protect the transistors against surge currents.

Additional overload current protection is also desirable and is provided by means of the relay 144 as mentioned supra. The relay contacts are coupled to gate electrode of silicon controlled rectifier 208 by means of resistor 210. The silicon controlled rectifier 208 is coupled in series with a diode 212 across the bridge terminals 106 and 110. Additionally, a shunt capacitor 214 is directly coupled across the anode and cathode electrode of the silicon controlled rectifier 208. The purpose for the relay 144 in combination with the silicon controlled rectifier 208 is that a continuous high current through the motor terminals 116 and 118 as sensed by resistor 158 will energize the relay 144 at which time the silicon controlled rectifier 208 is rendered conductive by means of the current pulse applied to its gate. When silicon controlled rectifier 208 is triggered, it becomes conductive, providing a shunt across bridge rectifier terminals 106 and 110. The current, however, is limited by the resistor 114. Capacitor 214 provides for triggering enhancement when the relay contacts of relay 144 close since upon conduction capacitor 214 will discharge through the silicon controlled rectifier 208 helping to maintain its current conductivity. The flow of current through the diode 212 and the silicon controlled rectifier 208 when triggered also effectively shunt the transistors 136, 146, 162, and 164 causing them to become inoperative. When transistors 146 and unijunction transistor 136 becomes deactivated, the silicon controlled rectifiers 76 and 78 in the bridge rectifier circuit become completely inoperative and all motor drive potential is removed from the terminals 116 and 118. To reenergize the motor it becomes necessary to turn off the switch 90 at which time silicon controlled rectifier 208 becomes nonconductive. When the switch 90 is again closed, the circuit will become operable until such time that excessive high current conditions again exist.

Figure 5:
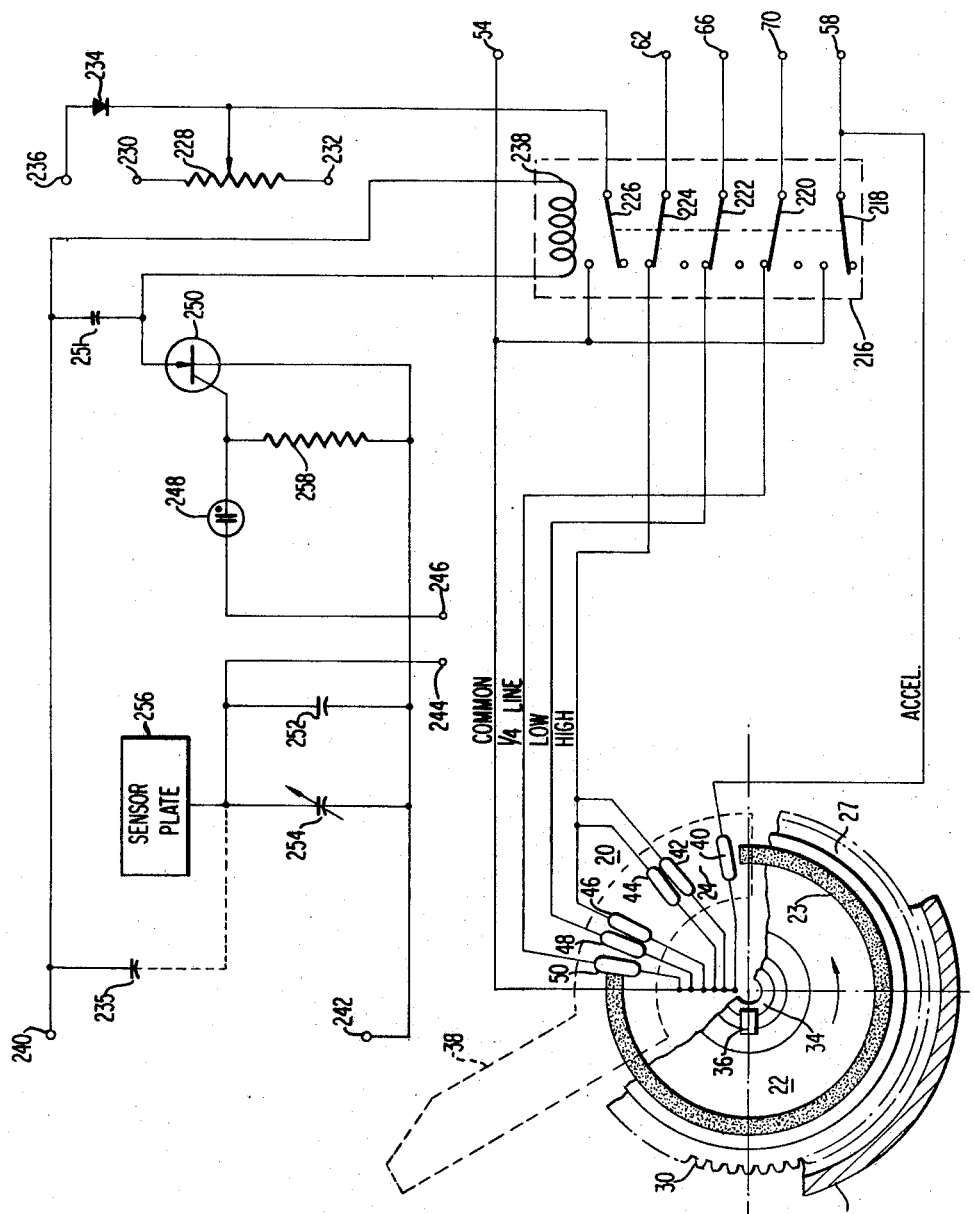
FIGURE 5 is a schematic diagram of additional circuitry which may be utilized when desirable for a proximity energization system.

Referring now to FIGURE 5, a modification of the control circuitry shown in FIGURE 4 is provided for actuating the revolving door, not shown, in accordance with the present invention by means of use of proximity actuation. When the latter embodiment is desired, the magnetic reed switch assembly 20 is coupled through relay 216 to terminals 58, 62, 66 and 70 and to the circuitry shown in FIGURE 4. The relay 216 is comprised of a multi-pole, two-position relay such that the armature 218 of one set of contacts is coupled to terminal 58, the armature of another set of contacts 220 is coupled to terminal 70 and armatures 222 and 224 are connected to terminals 66 and 62, respectively. The last armature 226 of relay 216 is connected to the tap of an additional potentiometer 228 which is adapted to be coupled in parallel to potentiometers 178, 180 and 184 by means of the terminals 230 and 232. The tap of potentiometer 228 is also adapted to be coupled back to the collector of transistor 162 by means of the diode 234 connected to terminal 236. The coil 238 of the relay 216 is adapted to be coupled across rectifier bridge terminals 98 and 100 by means of terminals 240 and 242 shown in FIGURE 4; however, the coupling is effected through one set of relay contacts of switch 71 connected to terminals 244 and 246 (FIGURE 4), a neon bulb 248 and a silicon controlled rectifier 250. Additionally, capacitors 252 and 254 are coupled to a sensor plate 256 which in turn is adapted to be coupled to terminal 240 by means of the body capacity of a user coming into proximity of the sensor plate 256. A resistor 258 is connected from the gate electrode of silicon controlled rectifier 250 to terminal 242. The circuit operation is such that when the manual switch 71 is open the circuit is completely inoperative, but in the event that the switch 71 is closed, the relay 216 will be unenergized because the silicon controlled rectifier 250 is nonconductive. However, when a user approaches the sensor plate 256, the body capacity 235 of the user, not shown, will cause the neon bulb 248 to fire, at which time a trigger pulse will be immediately coupled to the gate of silicon controlled rectifier 250. This pulse is developed across resistor 258. The relay coil 238 becomes energized and the armatures 218–226 will close a circuit now including potentiometer 288 at which time transistor 146 will be driven into conduction and oscillation of the unijunction transistor oscillator including unijunction transistor 136 will commence.

The wings begin to rotate, and as long as the user effects closure of the capacitance circuit across terminals 240 and 242, the revolving door will operate continuously. When the user exits the revolving door, on the other hand, the silicon controlled rectifier 250 will become nonconductive and relay 216 will become deenergized whereupon the door operation will commence under the control of the reed switches 40 through 50 and the magnetic actuator, therefore, as previously explained, until the quarterline stop position is reached whereupon operation halts.

Briefly then, what has been shown and described is a quarterline stop control system for a power-assisted revolving door utilizing a magnetic reed switch configuration and actuator therefor being rotated in accordance with the revolving door for causing the motor control circuit coupled between the magnetic reed switches and the electrical drive motor to generate selected motor power signals at selected positions for starting the revolving doors and driving the wings at a relatively high speed or speeds for a first portion of a complete revolution, at a relatively lower speed or speeds for substantially the remainder of a complete revolution, and stopping operation at the quarterline position after a substantially complete revolution of the revolving door.

While there has been shown and described what is at present considered to be the preferred embodiment of the invention, modifications will readily occur to those skilled in the art. It is not desired therefore that the invention be limited to the specific arrangement shown and described, but it is to be understood that all equivalents, alterations, and modifications within the spirit and scope of the invention are herein meant to be included.

What is claimed is:

1. A quarterline stop control apparatus for a power-assisted revolving door including a plurality of wings connected to a door shaft and having an electric motor turning the door through a power coupling device connected to the door shaft, comprising in combination:

magnetically operated switch means adapted to operate at a first position of said revolving door for causing said door to rotate at a selected speed for a predetermined portion of a complete door revolution and stopping rotation thereof at a quarterline stop position;

magnetic actuator means coupled to said revolving door, being turned in accordance therewith, for operating said switch means at said first position and said quarterline stop position; and an electric motor control circuit means coupled to said switch means and said electric motor, being responsive to the actuation of said switch means for generating a first electrical power signal for said electric motor at said first position and a stop signal at said quarterline stop position.

2. The invention as defined by claim 1 wherein said switch means is adapted to stop rotation of said revolving door at a quarterline stop position after a substantially complete revolution of said doors.

3. The invention as defined by claim 1 wherein said switch means comprises:
   a switch mount assembly located on said power coupling device; and
   a plurality of magnetically operated switches selectively located on said switch mount assembly; and
   wherein said magnetic actuator means is located on said power coupling device adjacent said switch mount assembly for consecutively actuating said plurality of magnetically operated switches in accordance with rotation of said revolving door.

4. The invention as defined by claim 3 additionally including means for coupling said magnetic actuator means to the door shaft.

5. The apparatus as defined by claim 3 wherein said power coupling device comprises a speed controller mechanism having a spur gear coupled to the door shaft and wherein said magnetic switch mount assembly is located interiorly of said speed controller is proximity to said spur gear and wherein said magnetic actuator means is mounted on said main gear.

6. The invention as defined by claim 5 wherein said magnetic actuator means comprises a strip of magnetic material having a predetermined length.

7. The invention as defined by claim 6 wherein said strip of magnetic material comprises a circular strip or magnetic material, and additionally including a substantially circular magnetic strip holder including a groove wherein said magnetic strip is mounted, said combination of said circular magnetic strip and said magnetic strip holder being mounted on said spur gear and wherein said magnetic switch mount assembly is located adjacent to the circular magnetic strip.

8. The invention as defined by claim 7 wherein; said magnetic switch mount assembly is located above said magnetic strip; wherein said plurality of magnetically operated switch means are actuated sequentially as the upper surface of said magnetic strip passes beneath said switch mount assembly.

9. The invention as defined by claim 3 wherein said plurality of magnetically operated switches comprises a first reed switch adapted to operate at a first position of said wings for causing said electric motor to accelerate the revolving door from a stop position, a second reed switch adapted to operate at a second position of said wings for causing said electric motor to drive said door at a selected speed for a predetermined portion of a complete door revolution, and a third magnetic reed switch adapted to operate at a third position of said wings for stopping said electric motor and causing said wings to stop at a quarterline position.

10. The invention as defined by claim 3 wherein said plurality of magnetically operated switches comprises a reed switch which when energized operates said motor control circuit at a starting position for causing said electric motor to accelerate from a stop position, at least one other magnetic reed switch subsequently energized for causing said motor control circuit to operate said electrical motor and said revolving door at a first speed for a predetermined portion of a door revolution, at least another reed switch subsequently energized after said one other magnetic reed switch for causing said electric motor to operate at a second speed for another predetermined portion of a door revolution, and at least still another magnetic reed subsequently energized after said another reed switch for causing said electric motor and said revolving door to stop at a quarterline position.

11. The invention as defined by claim 10 wherein said electric motor control circuit means includes gated rectifier means operated in response to said plurality of reed switches for generating an acceleration electric motor power signal, a relatively high motor power signal for operating said revolving door at a safe walking speed for a predetermined portion of a door revolution, a relatively lower motor power signal for said another predetermined of a door revolution and a stop control signal at said quarterline stop position.

12. The invention as defined by claim 11 wherein said electric motor control circuit means additionally includes gated oscillator means coupled to said plurality of magnetic reed switches and energized thereby for providing triggering output signals of a predetermined frequency in response to the actuation of said plurality of magnetic reed switches, circuit means coupling said triggering output signals to said gated rectifier circuit, and an electric motor protection circuit coupled to said gated oscillator means, being selectively responsive to motor load current and/or voltage for altering the operation of said gated oscillator to reduce the output of said gated rectifier to safe operating limits.

13. The invention as defined by claim 12 wherein said gated rectifier comprises a bridge rectifier including controlled rectifiers connected in adjacent legs thereof.

14. The invention as defined by claim 12 wherein said protection circuit means comprises transistor means operably connected to gated oscillator circuit means to reduce the input to said gated oscillator circuit means in the event of excessive voltage to said electric motor for reducing the triggering rate to said gated rectifier circuit, thereby reducing the electrical power applied to said electric motor.

15. The invention as defined by claim 12 and additionally including another motor protection circuit comprising a first switch device responsive to the voltage applied to said electric motor and coupled thereto for disconnecting said electric motor from said control circuit when said voltage exceeds a predetermined level and a second switch device coupled across said gated rectifier and being responsive to said current drawn by said electric motor to deactivate said gated rectifier when said current exceeds a predetermined level.

16. The invention as defined by claim 6 wherein said strip of magnetic material is substantially arcuate, and a holder mounted on said gear and movable therewith, said magnetic strip mounted on said holder, and said magnetic switch mount assembly located adjacent the path of movement of said magnetic strip.

References Cited

UNITED STATES PATENTS

| | | | |
|---|---|---|---|
| 1,119,080 | 12/1914 | Hope-Jones | 49—43 X |
| 2,607,909 | 8/1952 | Scofield | 318—272 X |
| 2,932,699 | 4/1960 | Reese | 335—206 |
| 2,954,971 | 10/1960 | Simpson | 49—43 X |
| 3,223,801 | 12/1965 | Cummins et al. | 335—206 |
| 3,364,620 | 1/1968 | Hess et al. | 49—43 |

DENNIS L. TAYLOR, Primary Examiner

U.S. Cl. X.R.

49—32; 335—206